United States Patent [19]
Goddard

[11] 3,775,894
[45] Dec. 4, 1973

[54] APPARATUS FOR ATTACHING HOOKS TO TROTLINE AND FOR SETTING TROTLINE

[76] Inventor: Robert V. Goddard, 8344 E. 11 St., Tulsa, Okla. 74112

[22] Filed: Nov. 3, 1971

[21] Appl. No.: 195,125

[52] U.S. Cl............................................. 43/54.5 A
[51] Int. Cl............................................. A01k 97/00
[58] Field of Search............................ 43/54.5, 27.4

[56] References Cited
UNITED STATES PATENTS

| | | | |
|---|---|---|---|
| 3,466,785 | 9/1969 | Shook | 43/27.4 |
| 3,022,601 | 2/1962 | Martin | 43/54.5 A |
| 2,778,142 | 1/1957 | Berry | 43/54.5 A |

Primary Examiner—Louis G. Mancene
Attorney—Robert E. Massa

[57] ABSTRACT

An apparatus for attaching hooks to a trotline and for setting the trotline comprises a body portion having a vertical shaft received swivelably in a clamp member and a horizontally extending hook supporting arm. The hook supporting arm has a plurality of serrations along the upper edge so that each hook of a trotline may be positioned within each serration. A hook retaining member is pivotally attached to the hook supporting arm near the aforesaid shaft in a manner that the lower surface of the hook retaining member may lightly hold each hook within its respective serration. Then, the trotline may be played out as desired with each hook in turn moving along the serrated edge to the dispensing end of the arm without entanglement of any attachment line.

7 Claims, 3 Drawing Figures

PATENTED DEC 4 1973

3,775,894

INVENTOR.
ROBERT V. GODDARD

BY Robert C. Massa

ATTORNEY

APPARATUS FOR ATTACHING HOOKS TO TROTLINE AND FOR SETTING TROTLINE

BACKGROUND OF THE INVENTION

This invention relates to devices which are useful in fishing, and more particularly, to an apparatus useful for controlling a trotline. Still more particularly, this invention relates to an apparatus useful for attaching hooks to a trotline and for setting a trotline.

A trotline is a type of fishing line which usually consists of a main line of heavy cord perhaps 100 to 200 feet in length to which as many as one hundred short staging lines are attached with each staging line being usually from 1 to 4 feet in length and a hook attached to the end of each. Then, in practice, the main line is strung out across a body of water in a manner that the staging lines will provide a heavy concentration of hooks across the body of water and thereby increase the probability of catching fish.

Usually, the staging lines are attached to the main line with either a simple knot or by means of a simple, quick attachment device. In either case, the fisherman may attach the staging lines to the main line either long before he is ready to deploy the trotline or as he deploys the trotline from his position in his boat.

The length of the main line, the amount of staging line used, and the number of hooks involved quite often cause the lines to be tangled and presents a considerable hazard to the fisherman in handling the sharp hooks.

These problems have been recognized for many years and there have been numerous attempts to solve these problems. For example, the following U.S. patents are all directed to the problem of controlling the dispensing of a trotline while attempting to provide the maximum safety and efficiency: U.S. Pat. No. 2,531,643 to Pringle, issued Nov. 28, 1950; U.S. Pat. No. 2,857,706 to Skains, issued Oct. 28, 1958; U.S. Pat. No. 3,060,622 to Lowery, issued Oct. 30, 1962; and U.S. Pat. No. 3,466,785 to Shook, issued Sept. 16, 1969.

SUMMARY OF THE INVENTION

Therefore, the primary object of this invention is to provide an apparatus for controlling a trotline which is inexpensive, easy to manufacture, and easy to use.

Another object of this invention is to provide an apparatus for controlling a trotline which may be easily manipulated by a fisherman during use in setting hooks on a trotline or in dispensing a trotline.

Still another object of this invention is to provide an apparatus for controlling a trotline which may be placed in use either by attachment to a boat or other object or by being held in the hand.

These and other objects of the invention will become apparent from the following claims and accompanying drawings which describe the invention as an apparatus for controlling a trotline both during the time the fisherman is engaged in attaching the hooks to the trotline and during the time the fisherman is dispensing the trotline from his boat into the water. The main features of this apparatus are that the individual hooks each rest in a separate groove along a serrated edge and are held in position by an arm member biased toward that serrated edge, and that the apparatus may be either swivelably positioned in a clamp or held in the hand during either operation.

DESCRIPTION OF THE PREFERRED EMBODIMENTS

A trotline hook controller according to this invention comprises a hook supporting arm having an upper serrated edge with serrations beginning adjacent a first end of the arm and extending along a major portion thereof, said arm adaptable to receive and support a hook of a trotline; a hook retaining member pivotally attached to said arm adjacent a second end thereof; said hook retaining member including an elongated hook contacting member and means to bias the contacting member toward said hook supporting arm to retain hooks in position along said serrated edge; and, a downwardly depending rod member attached to said arm adjacent said second end by which said controllers may be held.

Figure 1:
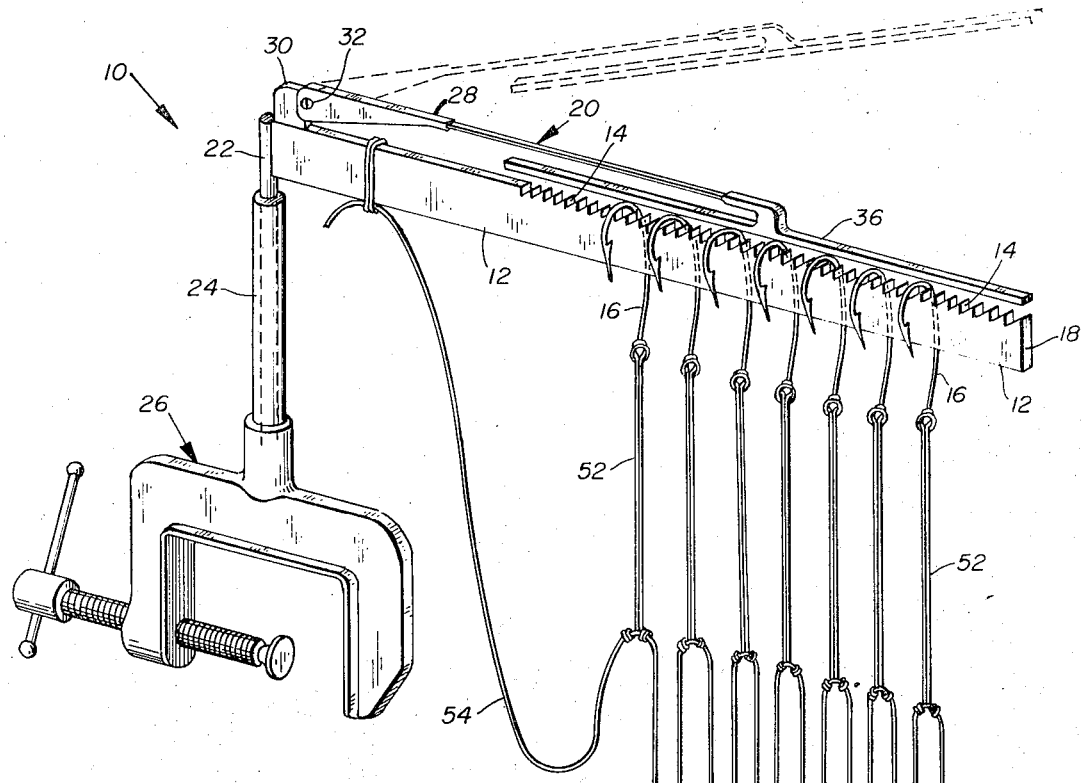
FIG. 1 is a perspective view of an apparatus according to this invention showing a portion of a trotline in proper position for dispensing.
Figure 2:
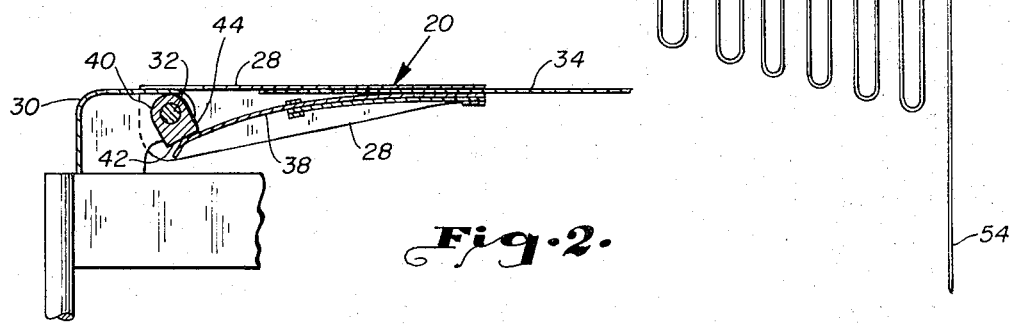
FIG. 2 is a sectional view of a portion of an apparatus according to this invention showing one means of biasing a hook retaining member toward the hooks in position.

FIG. 1 describes a trotline hook controller 10, generally, showing the hook controller having a trotline positioned thereon ready for dispensing. Hook controller 10 includes a hook supporting arm 12 having a plurality of serrations 14 along an upper edge thereof and extending along a major portion of the upper edge. Serrations 14 are sawtooth in configuration so that each hook of a trotline, such as hooks 16 may easily move from its individual resting place within a serration toward a forward end 18 of arm 12 and yet be somewhat restricted in movement toward the rear of arm 12, especially when hooks 16 are held in position by the biasing force exerted by hook retaining member 20, generally. Arm 12 is secured to a downwardly depending rod member 22 which may be either held in the hand during use of the apparatus or may be freely swivelably inserted into tubular member 24 attached to a conventional C-clamp 26 for mounting on a convenient portion of a boat or other structure.

As stated above, hooks 16 are held in position by the biasing action of hook retaining member 20. Hook retaining member 20 is pivotally mounted on arm 12 by having sleeve member 28 pivotally mounted on bracket 30 by pin 32. Attached to sleeve 28 is a slightly resilient arm member 34 which assists in maintaining a biasing force of an elongated hook contacting member 36 against hooks 16. The main biasing force of hook retaining member 20 is provided by spring means, such as flat spring 38 mounted in sleeve 28 which is in slidable contact with lug 40. Spring 38 is in contact with flat side 42 of lug 40 to give a downward biasing force, and, when sleeve 28 is raised, spring 38 contacts a portion of side 44 of lub 40 to hold hook retaining member 20 in an upward position.

Figure 3:
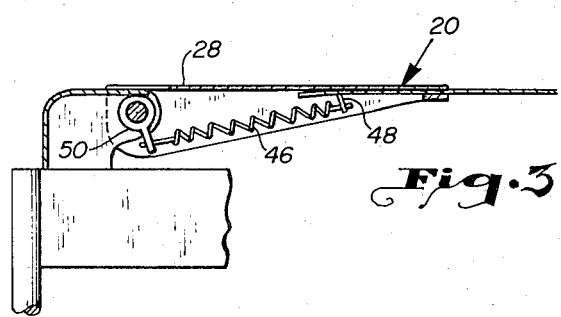
FIG. 3 is a sectional view of an alternate embodiment of biasing means of a hook retaining arm.

An alternate means of biasing hook retaining member 20 toward hooks 16 is described in FIG. 3 wherein a coil spring 46 is mounted between hooks 48 and 50.

As stated above, the apparatus of this invention may be used for attaching hooks easily and conveniently to a trotline or for holding a trotline in proper condition for dispensing. As may easily be seen from FIG. 1, hooks 16 may be deployed along serrations 14 and subsequently attached to staging lines 52, each of which may be then attached to trotline 54; or, hooks 16 which have previously been attached to staging line 52 and trotline 54, may be placed on serrations 14 for convenient and efficient dispensing of the trotline into the water. It is easily seen then that the provision of serrations 14 with the cooperation of hook contacting member 36 will maintain the hooks in proper order so that all operations may be carried out safely and conveniently and so that the dispensing of the hooks from the serrations can be easily done.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:
1. A trotline hook controller comprising:
 a hook supporting arm having an upper serrated edge with serrations beginning adjacent a first end of said arm and extending along a major portion thereof, said arm adaptable to receive and support a hook of a trotline,
 a hook retaining member pivotally attached to said arm adjacent a second end thereof,
  said hook retaining member including an elongated hook contacting member and means to bias the contacting member toward said hook supporting arm to retain hooks in position along said serrated edge, and,
 a downwardly depending rod member attached to said arm adjacent said second end by which said controller may be held.

2. A trotline hook controller as described in claim 1, which includes clamping means adaptable to receive said rod member and by means of which said controller may be secured to a boat.

3. A trotline hook controller as described in claim 2 wherein said clamping means includes an upstanding tubular member to receive said rod member swivelably therein.

4. A trotline hook controller as described in claim 3, wherein said means to bias the contacting member toward said hook supporting arm includes spring means attached to said hook retaining member adjacent the point of pivotal attachment of said hook retaining member to said hook supporting arm.

5. A trotline hook controller as described in claim 4, wherein said spring means includes a flat spring attached to said hook retaining member and tensionably contacting a pin on said hook retaining member at said point of pivotal attachment.

6. A trotline hook controller as described in claim 5, wherein said serrations are of sawtooth configuration oriented toward said first end in order to permit hooks to be easily removed slidably from said controller along said serrations.

7. A trotline hook controller as described in claim 4, wherein said spring means includes a coil spring having a first end attached to said hook retaining member and a second end attached to a pin at said point of pivotal attachment.

* * * * *